(12) United States Patent
Cierniak et al.

(10) Patent No.: US 8,374,975 B1
(45) Date of Patent: Feb. 12, 2013

(54) CLUSTERING TO SPREAD COMMENTS TO OTHER DOCUMENTS

(75) Inventors: Michal Cierniak, Palo Alto, CA (US);
Donn Denman, Los Gatos, CA (US);
Derek Prothro, San Francisco, CA (US); Tony Hsieh, Cupertino, CA (US);
Marc Pawliger, San Jose, CA (US)

(73) Assignee: Google Inc., Mountain View, CA (US)

( * ) Notice: Subject to any disclaimer, the term of this patent is extended or adjusted under 35 U.S.C. 154(b) by 702 days.

(21) Appl. No.: 12/539,913

(22) Filed: Aug. 12, 2009

(51) Int. Cl.
*G06F 15/18* (2006.01)
(52) U.S. Cl. .......................................................... 706/12
(58) Field of Classification Search ....................... 706/12
See application file for complete search history.

(56) References Cited

U.S. PATENT DOCUMENTS 7,814,040 B1 * 10/2010 Zhang et al. .................... 706/45

OTHER PUBLICATIONS

W. Jin et al., "A Semi-Naive Bayesian Method Incorporating Clustering with Pair-wise Contraints for Auto Image Annotation", ACM MM 2004, pp. 336-339.*
K. Bielenberg and M. Zacher, "Groups in Social Software: Utilizing Tagging to Integrate Individual Contexts for Social Navigation", Masters Thesis, Universidat Bremen, Aug. 16, 2005.*
Amazon.com, screenshot from Feb. 12, 2009, available at http://web.archive.org/web/20090210043602/http://www.amazon.com/Nikon-D90-Digital-18-105mm-3-5-5-6G/dp/B001ENOZY4, accessed Apr. 4, 2012.*

* cited by examiner

*Primary Examiner* — Kakali Chaki
*Assistant Examiner* — Vincent Gonzales
(74) *Attorney, Agent, or Firm* — Harrity & Harrity, LLP

(57) ABSTRACT

A server device receives a comment associated with a first document, where the comment provides an opinion of, or remarks upon, a content of the first document. The server device obtains document clustering information which indicates that the first document is clustered with one or more second documents and stores, in a memory associated with the server device, the comment in association with the first document and the one or more second documents. The server device presents the comment in connection with the first document or one of the one or more second documents when the first document or the one of the one or more second documents is accessed by a user.

25 Claims, 13 Drawing Sheets

CLUSTERING TO SPREAD COMMENTS TO OTHER DOCUMENTS

BACKGROUND

Many techniques are available to users today to find information on the world wide web ("web"). For example, users often use web browsers and/or search engines to find information of interest.

A user may enter a search query into a search box of a browser and the browser may submit the search query to a search engine. The search engine may identify documents that match the search query, rank the documents based on various factors, and return a ranked list of document to the user. The user may select a document from the list and request the document. A browser may retrieve the requested document and display the document to the user in a browser window.

However, the amount of available information that is available to users on the web can be overwhelming.

SUMMARY

According to one implementation, a method performed by one or more server devices may include receiving, by a processor associated with the one or more server devices, a comment associated with a first document, where the comment provides an opinion of, or remarks upon, a content of the first document and obtaining, by a processor associated with the one or more server devices, document clustering information which indicates that the first document is clustered with one or more second documents. The method may further include storing, in a memory associated with the one or more server devices, the comment in association with the first document and the one or more second documents and presenting, by the one or more server devices, the comment in connection with the first document or one of the one or more second documents when the first document or the one of the one or more second documents is accessed by a client device.

According to another implementation, a system may include one or more devices to: receive a comment associated with a first document, the comment providing an opinion or remark regarding at least a portion of the first document, identify that the first document is clustered with a second document, store the comment in association with the first document and the second document, receive, from a client device, information that the client device is accessing the second document, and transmit the comment for presentation in connection with the second document on a display associated with the client device.

According to yet another implementation, a server device may include a memory and one or more processors to: use machine learning techniques to deduce that a first document is related to a same topic or concept as a second document, receive a comment associated with the first document, the comment providing an opinion or remark regarding at least a portion of the first document, store, in the memory, the comment in association with the first document and the second document, receive, from a client device, information that the client device is accessing the second document, and transmit the comment for presentation in connection with the second document on a display associated with the client device.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

For some documents, users might like to see users' comments regarding these documents. A "comment," as used herein, may include text (i.e., styled or markup text such as, for example, HyperText Markup Language (HTML)), audio data, video data, and/or image data that provides an opinion of, or otherwise remarks upon, the contents of a document or a portion of a document. One example of a comment may include a document whose sole purpose is to contain the opinion/remark. Another example of a comment may include a blog post. Yet another example of a comment may include a web page or a news article that remarks upon an item (e.g., a product, a service, a company, a web site, a person, a geographic location, or something else that can be remarked upon). A further example is a comment containing an opinion/remark about another comment.

A "document," as the term is used herein, is to be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Figure 1:
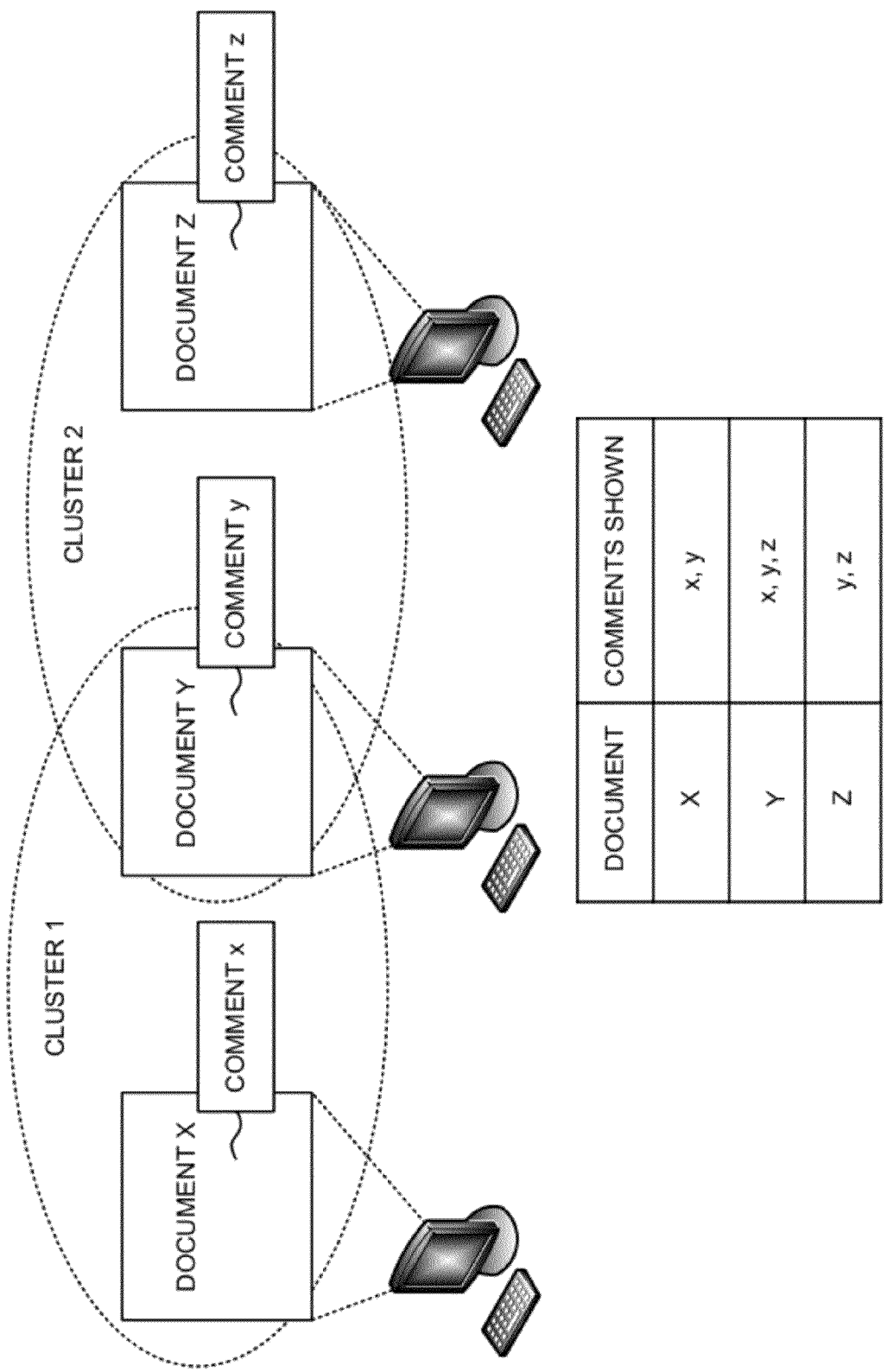
FIG. 1 is a diagram illustrating an exemplary overview of an implementation described herein.

FIG. 1 is a diagram illustrating an overview of an exemplary implementation described herein. As shown in FIG. 1, assume that a user requests access to a document about a particular topic (shown as "document X" in FIG. 1). The user may decide to provide a comment regarding the document. The user might activate a commenting function to provide the comment. The user may then provide an opinion or remark for the comment (shown as "comment x" in FIG. 1).

Further assume that a user requests access to another document about a particular topic (shown as "document Y" in FIG. 1). The user may decide to provide a comment regarding the document. The user might activate the commenting function to provide the comment. The user may then provide an opinion or remark for the comment (shown as "comment y" in FIG. 1).

Also assume that a user requests access to a further document about a particular topic (shown as "document Z" in FIG. 1). The user might activate the commenting function to provide the comment. The user may then provide an opinion or remark for the comment (shown as "comment z" in FIG. 1).

The comments may be stored in a database in association with their respective documents (i.e., comment x in association with document X, comment y in association with document Y, etc.). Document clustering information may be obtained which indicates that the documents belong to one or more of various clusters of documents. For example, the documents may be clustered using various techniques that deduce that the content of the documents within a cluster are about a same concept or topic. As shown in the example of FIG. 1, document X may be clustered with document Y, and document Y may be clustered with document Z. The comments, associated with each document within a cluster, may then be "spread" to the other documents within the cluster. In the example of FIG. 1, comment x may be spread to document Y and comment y may be spread to document X. Additionally, comment y may be spread to document Z and comment z may be spread to document Y. Thus, when a user accesses one of the documents in a cluster, the comments associated with the accessed document, in addition to comments from other documents in a same cluster as the one document, may be presented to the user. For example, as depicted in the table shown in FIG. 1, when document X is accessed, comments x and y may be presented to the user (with comment y having been spread to document X using clustering). As further depicted in the table shown in FIG. 1, when document Y is accessed, comments x, y and z may be presented to the user (with comments x and z having been spread to document Y using clustering). As also depicted in the table shown in FIG. 1, when document Z is accessed, comments y and z may be presented to the user (with comment y having been spread to document Z using clustering).

Exemplary Environment

Figure 2:
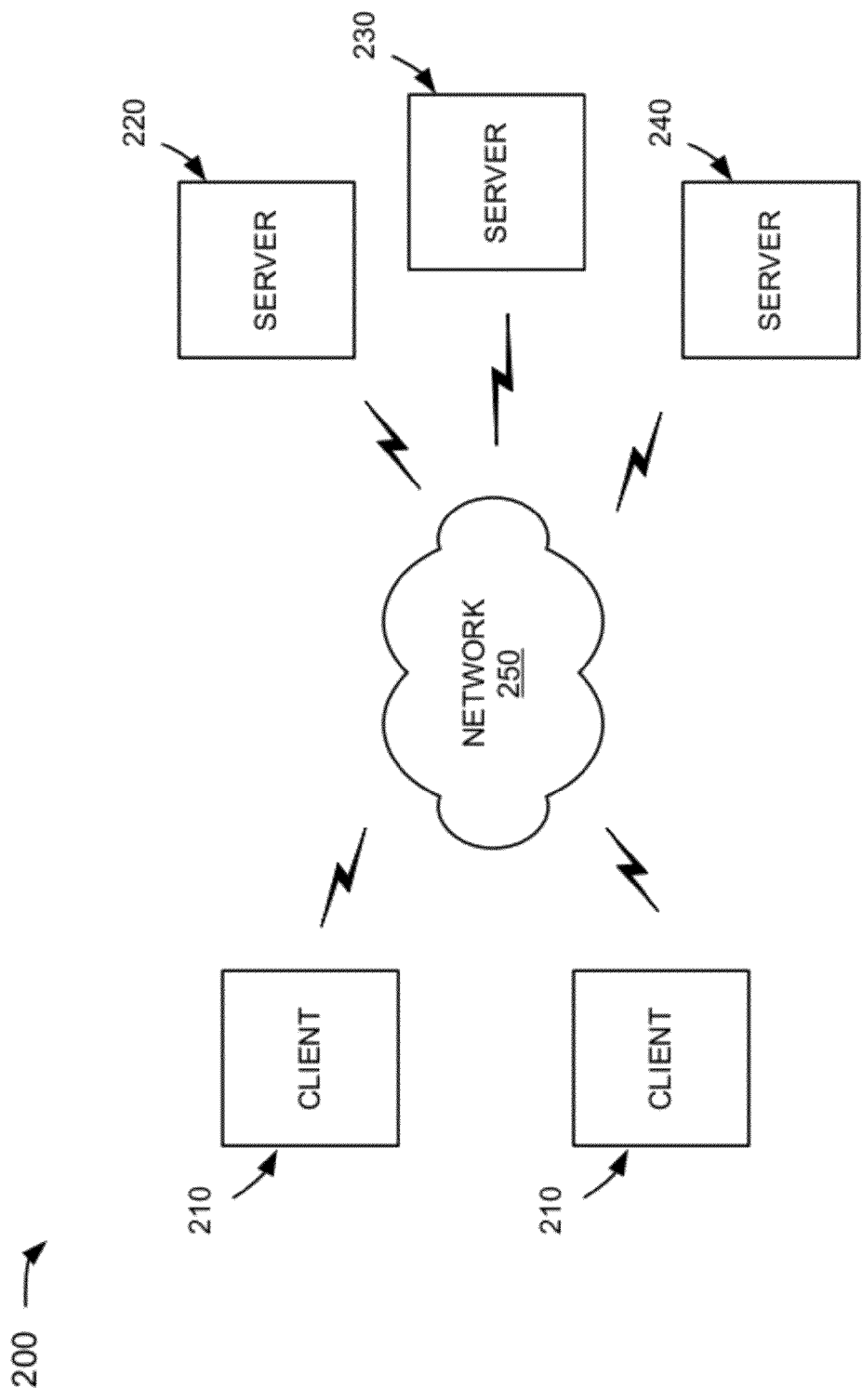
FIG. 2 is a diagram of an exemplary environment in which systems and methods described herein may be implemented.

FIG. 2 is a diagram of an exemplary environment 200 in which systems and methods described herein may be implemented. Environment 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executed by one of these devices. In one implementation, a client 210 may include a browser application that permits documents to be searched and/or accessed. Client 210 may also include software, such as a plug-in, an applet, a dynamic link library (DLL), or another executable object or process, that may operate in conjunction with (or be integrated into) the browser to obtain and display comments. Client 210 may obtain the software from server 220 or from a third party, such as a third party server, disk, tape, network, CD-ROM, etc. Alternatively, the software may be pre-installed on client 210. For the description to follow, the software will be described as integrated into the browser.

In one implementation, as described herein, the browser may provide a commenting function. The commenting function may permit a user to generate a comment regarding a document, permit the user to view a comment that was previously generated by the user or by other users, and/or permit the user to remove a comment from presentation via the browser (e.g., hide the comment from view).

Servers 220-240 may include server entities that gather, process, search, and/or maintain documents in a manner described herein. In one implementation, server 220 may gather, process, and/or maintain comments that are associated with particular documents. Servers 230 and 240 may store or maintain comments and/or documents.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include any type of network, such as a local area network (LAN), a wide area network (WAN), a telephone network (e.g., the Public Switched Telephone Network (PSTN) or a cellular network), an intranet, the Internet, or a combination of networks. Clients 210 and servers 220-240 may connect to network 250 via wired and/or wireless connections.

Exemplary Components of Client and/or Server

Figure 3:
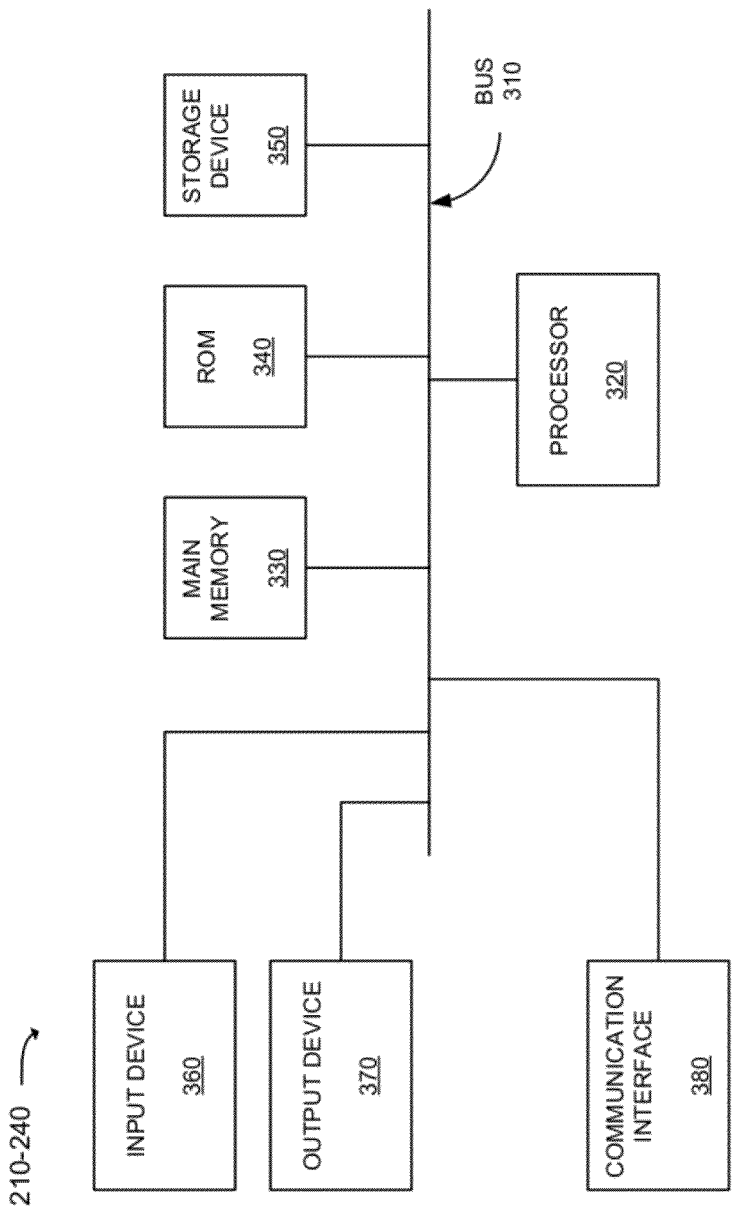
FIG. 3 is a diagram of exemplary components of a client or a server of FIG. 2.

FIG. 3 is a diagram of exemplary components of a client or server entity (hereinafter called "client/server entity"), which may correspond to one or more of clients 210 and/or servers 220-240. As shown in FIG. 3, the client/server entity may include a bus 310, a processor 320, a main memory 330, a read only memory (ROM) 340, a storage device 350, an input device 360, an output device 370, and a communication interface 380. In another implementation, client/server entity may include additional, fewer, different, or differently arranged components than are illustrated in FIG. 3.

Bus 310 may include a path that permits communication among the components of the client/server entity. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to the client/server entity, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity may perform certain operations relating to the processing of comments. The client/server entity may perform these operations in response to processor 320 executing software instructions contained in a computer-readable medium, such as memory 330. A computer-readable medium may be defined as a logical or physical memory device. A logical memory device may include a space within a single physical memory device or spread across multiple physical memory devices.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary Functional Components of Server

Figure 4:
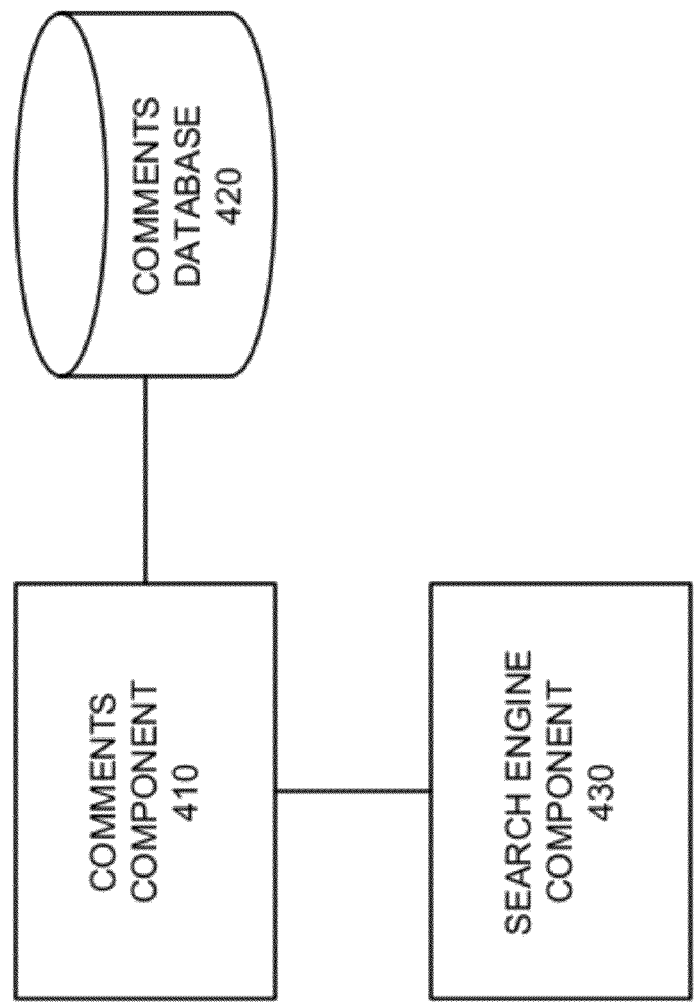
FIG. 4 is a diagram of functional components of a server of FIG. 2.

FIG. 4 is a diagram of exemplary functional components of server 220. As shown in FIG. 4, server 220 may include a comments component 410, a comments database 420, and a search engine component 430. In another implementation, server 220 may include additional or fewer functional components. For example, one or more of the functional components shown in FIG. 4 may be located in a device separate from server 220.

Comments component 410 may interact with clients 210 to obtain and/or serve comments. For example, a user of a client 210 may access a particular document and generate a comment regarding the document. Client 210 may send the comment and information regarding the document portion to comments component 410.

Comments component 410 may receive the comment provided by a client 210 in connection with the particular document. Comments component 410 may gather certain information regarding the comment, such as information regarding the author of the comment, a timestamp that indicates a date and/or time at which comment was created, the content of the comment, and/or an address (e.g., a uniform resource locator (URL)) associated with the document. Comments component 410 may receive at least some of this information from client 210. Comments component 410 may store the information regarding the comment in comments database 420.

Comments component 410 may also serve a comment in connection with a document accessed by a client 210. In one implementation, comments component 410 may obtain a comment from comments database 420 and provide that comment to client 210 when client 210 accesses a document with which that comment is associated in comments database 420.

Comments database 420 may store information regarding comments. In one implementation, comments database 420 may include various fields that are separately searchable. Comments component 410 may search comments database 420 to identify comments associated with a particular author or a particular document.

Figure 5:
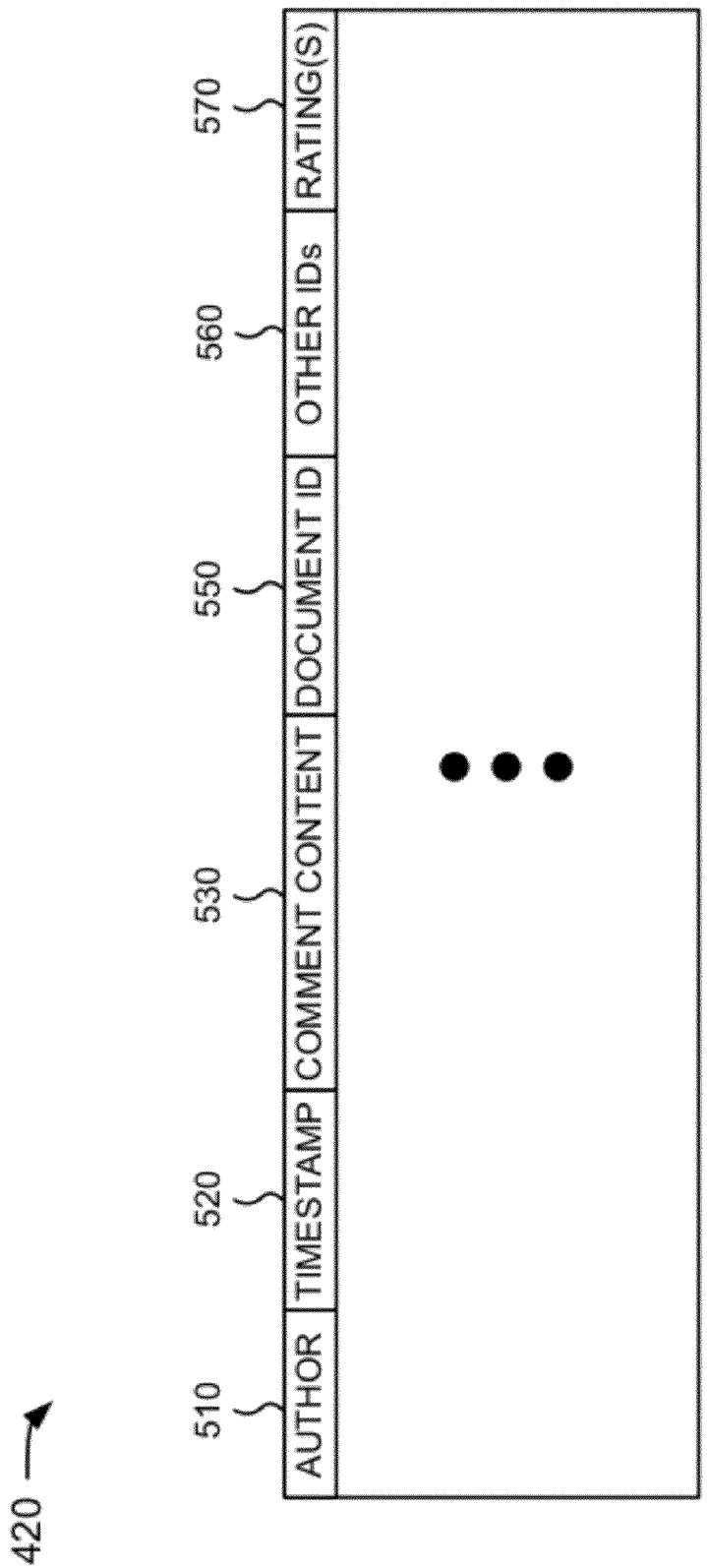
FIG. 5 is a diagram of exemplary fields that may be provided within the comments database of FIG. 4.

FIG. 5 is a diagram of exemplary fields that may be provided within comments database 420. As shown in FIG. 5, comments database 420 may include an author field 510, a timestamp field 520, a comment content field 530, a document identifier field 550, an other document identifiers (IDs) field 560, and a rating(s) field 570. In other implementations, comments database 420 may include more or fewer fields.

Author field 510 may store information regarding the author of the comment. For example, author field 510 may store the name of the author (e.g., actual name or online name), an image of the author, a graphic associated with the author, the name of a geographic location of the author, or other information regarding the author. Timestamp field 520 may store the date and/or time that the comment was created. The date/time for timestamp field 520 may be generated by client 210 at which the comment was created or may be generated by server 220 based on a date/time at which the comment is received from client 210. Timestamp field 520 may additionally store the date and/or time that a comment was modified or the date and/or time that the most recent revision of a comment was edited.

Comment content field 530 may store the content of the comment. For example, the content of a comment may include text, video data, image data, and/or audio data. In one implementation, comment content field 530 may store the actual content of the comment. In another implementation, comment content field 530 may store a pointer to a storage location where the actual content of the comment is stored.

Document identifier field 550 may store an address (e.g., a URL), or another type of unique identifier, for the document for which the comment was originally created. Other document IDs field 560 may store an address, or another type of unique identifier, for one of or more other documents with which the comment has been associated. As will be described in detail below, a comment created regarding one document may be associated with other documents.

Rating(s) field 570 may store a rating for the comment. A rating may be based on user feedback regarding the comment. For example, users may be permitted to rate a comment (favorably or unfavorably). These ratings may be used to determine whether and/or how to present the comment in connection with a particular document or any document. In one implementation, a single rating may be maintained for a comment. That single rating may be used to determine whether and/or how to present the comment in connection with any document with which the comment has been associated. In another implementation, a separate rating may be maintained for each document (or for a group of documents) with which the comment has been associated. In this case, the rating, associated with a particular document, may be used to determine whether to present the comment with that particular document.

Returning to FIG. 4, search engine component 430 may receive the document from comments component 410 and locate other documents within the same cluster based on document clustering information. The document clustering information may be obtained using machine learning techniques (described further below) that deduce that multiple documents relate to the same topic of concept.

Creating a Comment

Figure 6:
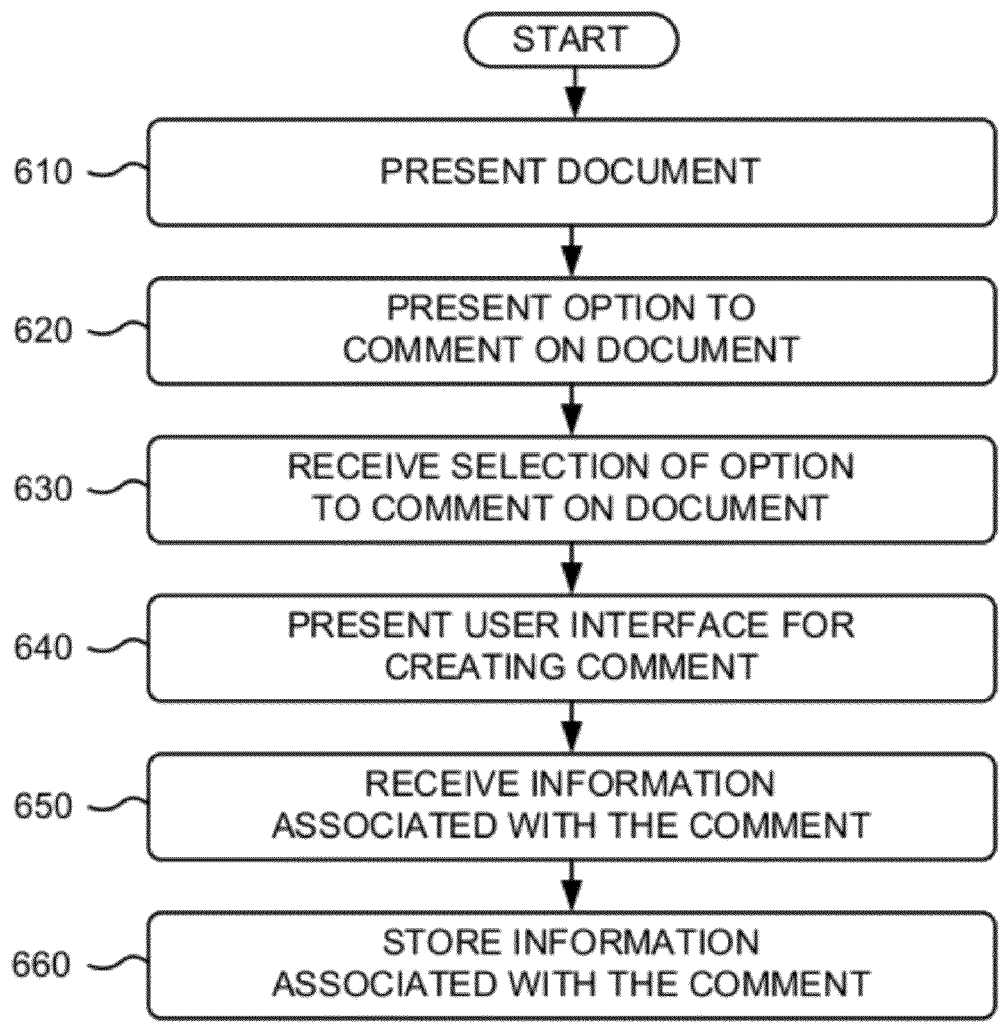
FIG. 6 is a flowchart of an exemplary process for creating a comment.

FIG. 6 is a flowchart of an exemplary process for creating a comment. In one implementation, the process of FIG. 6 may be performed by one or more components within client 210, server 220, or a combination of client 210 and server 220. In another implementation, the process may be performed by one or more components within another device or a group of devices separate from or including client 210 and/or server 220. Also, while FIG. 6 shows blocks in a particular order, the actual order may differ. For example, some blocks may be performed in parallel or in a different order than shown in FIG. 6.

The process of FIG. 6 may include presenting a document to a user of client 210 (block 610). For example, the user may access the document via a browser application operating on client 210. To obtain access to the document, for example, the user might enter an address (e.g., a URL) into the address field of the browser, the user might select a document from a list of documents (e.g., a list of favorites or bookmarks), or the user might perform a search using a search engine and select a search result corresponding to the document. In response to one of these actions, the browser application may contact a server hosting the document and obtain the document form that server.

An option to provide a comment regarding the document may be presented (block 620). For example, the browser may include a user interface item (e.g., a button, a menu item, etc.) that may permit the user to turn on and turn off the commenting function provided by the browser. The user may select this user interface item to create a comment, to view a comment, and/or to remove a presented comment from view (e.g., hide the comment from view).

Figure 7:
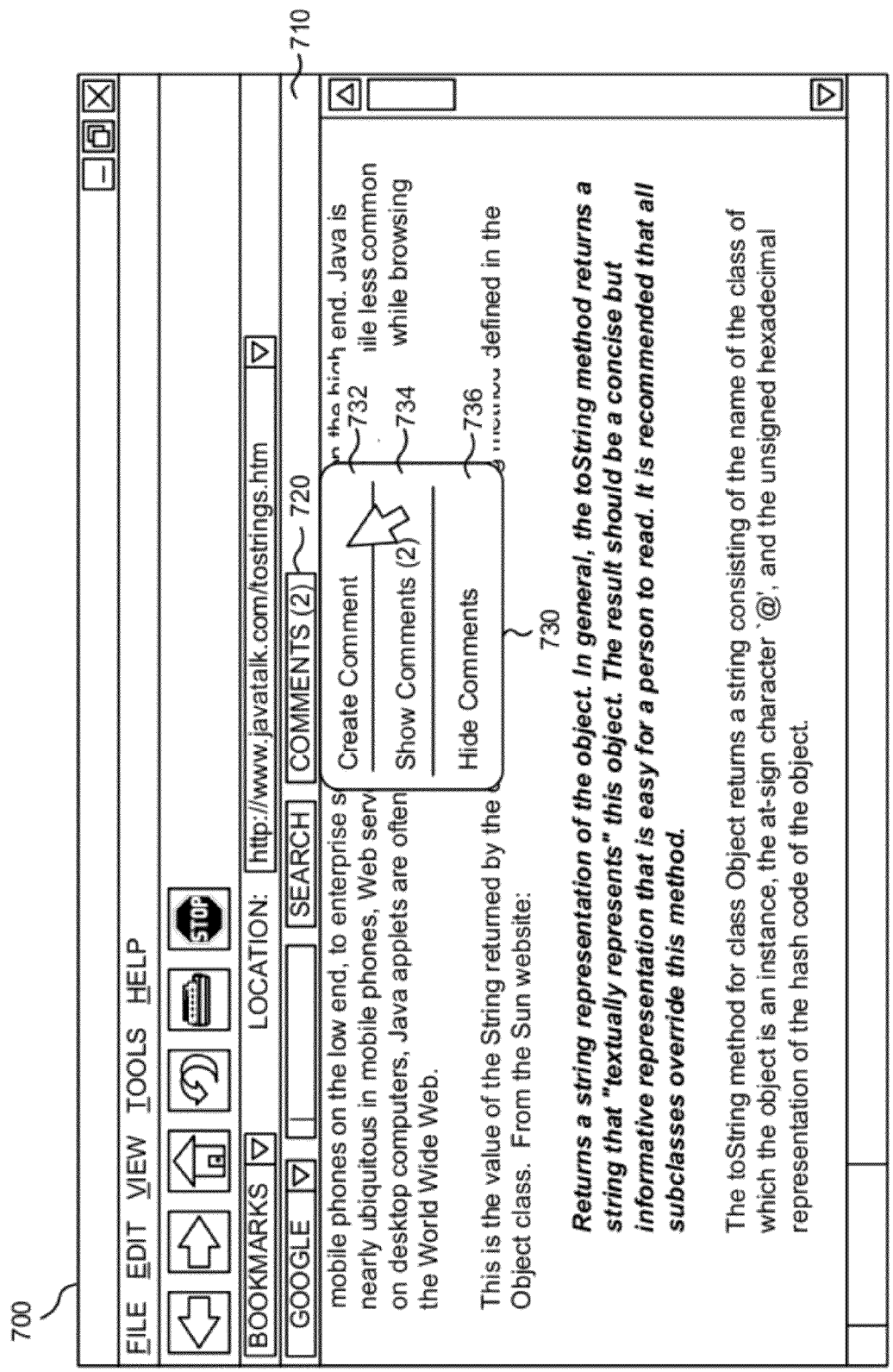
FIGS. 7 and 8 are diagrams of examples of creating a comment.

FIG. 7 is a diagram of an exemplary user interface that may be presented to a user to permit the user to activate the commenting function of the browser. As shown in FIG. 7, a browser window 700 may include an add-on toolbar 710 that includes a search box and a number of software buttons. In one implementation, toolbar 710 may include a comments button 720. Comments button 720 may optionally include information regarding the number of comments (shown as "(2)" in FIG. 7) that have been previously associated with the document that the user is currently accessing (shown as "www.javatalk.com/tostrings.htm" in FIG. 7).

Comments button 720 may permit the user to turn on and off the commenting function. In one implementation, selection of comments button 720 may cause a menu 730 to be presented. Menu 730 may include a number of options including, for example, an option to create a comment 732, an option to show previously created comments 734, and an option to hide the comments 736. The user may select option 732 to generate a comment regarding the document that the user is currently accessing. The user may select option 734 to view a comment that was previously associated with the document that the user is currently accessing (e.g., FIG. 7 shows that two comments have been previously associated with the document). The user may select option 736 to remove any presented comments from view (e.g., hide the comments from view).

Returning to FIG. 6, selection of the option to provide a comment regarding the document may be received (block 630). For example, the user might activate the commenting feature. In one implementation, the user might activate the commenting feature by selecting an item from a menu or by selecting a button on a toolbar. As shown in FIG. 7, for example, the user may select comments button 720 on toolbar 710 within browser window 700, and/or may select option 734 on menu 730.

A user interface may be presented to the user for creating the comment (block 640). For example, in response to receiving selection of comments button 720, the browser may present the user with a user interface via which the user may create a comment regarding the document portion. The content of the comment may be received (block 650). For example, the user may, via the user interface, input the content of the comment and/or insert a file as the content of the comment. The user interface may additionally provide the user with an option for specifying whether the created comment is only about the document, or document portion, or whether it may apply to other documents (e.g., apply to a group of documents obtained using clustering techniques described below with respect to FIG. 9).

Figure 8:
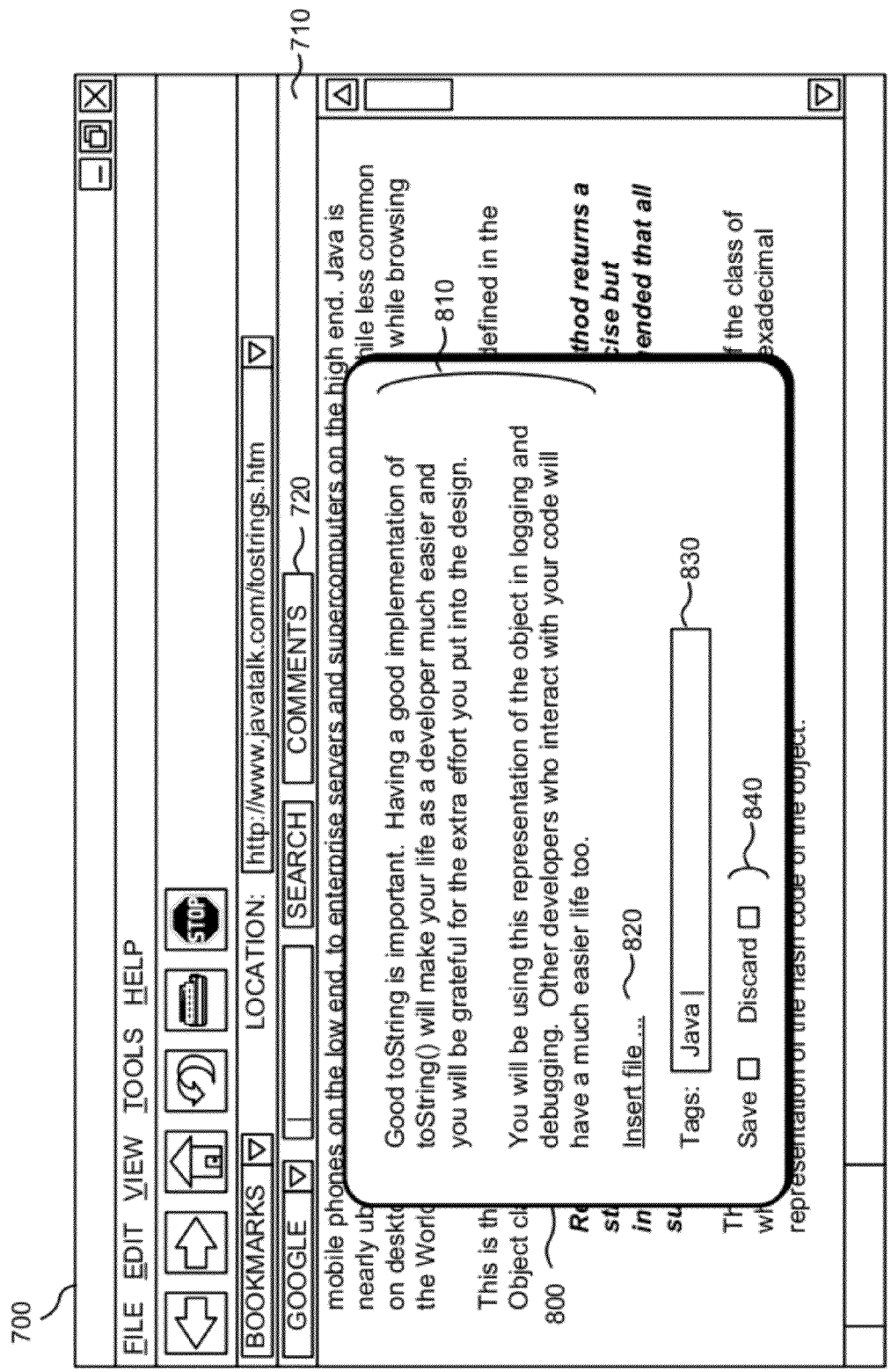

FIG. 8 is a diagram of an exemplary user interface that may be presented to a user to permit the user to create a comment. As shown in FIG. 8, browser window 700 may present a user interface 800 via which the user may enter the contents of the comment. User interface 800 may include input section 810, an option 820 to insert a file, a tags section 830, and save/discard options 840. Input section 810 may include an area into which the user may insert the contents of the comment (whether in the form of text, image data, video data, and/or audio data). Option 820 may permit the user to identify a file to be inserted into or attached to the comment. Tags section 830 may permit the user to identify keywords to associate with the comment. Save/discard options 840 may permit the user to select whether to save the comment or discard the comment without saving the comment.

Returning to FIG. 6, information associated with the comment may be stored (block 660). For example, the browser of client 210 may send information associated with the comment to comments component 410 of server 220. This information may include, for example, the name of the author of the comment (e.g., the user's name), a timestamp indicating the date and/or time that the comment was created, the content of the comment, and/or the address (e.g., URL) of the document. Comments component 410 may create or update an entry in comments database 420 using this information.

Using Clustering to Spread Comments to Other Documents

Figure 9:
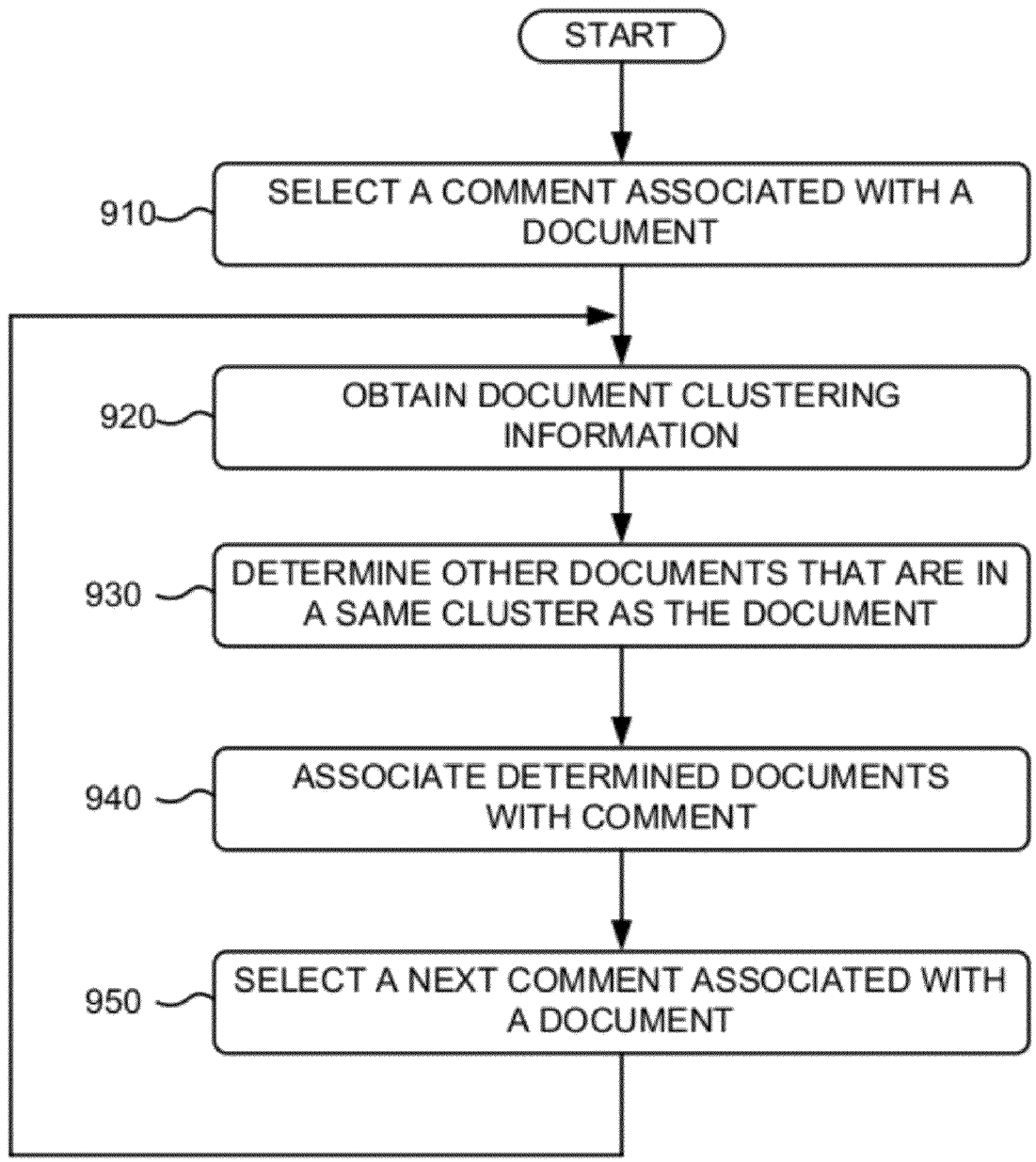
FIG. 9 is a flowchart of an exemplary process for spreading a comment to other documents.

FIG. 9 is a flowchart of an exemplary process for spreading a comment to other documents using clustering techniques. In one implementation, the process of FIG. 9 may be performed by one or more components within server 220, client 210, or a combination of server 220 and client 210. In another implementation, the process may be performed by one or more components within another device or a group of devices separate from or including server 220 and/or client 210. Also, while FIG. 9 shows blocks in a particular order, the actual order may differ. For example, some blocks may be performed in parallel or in a different order than shown in FIG. 9.

The process of FIG. 9 may be periodically performed on comments stored in comments database 420. Alternatively, the process of FIG. 9 may be performed, with regard to a particular comment, after information associated with that particular comment is stored in comments database 420. As described above, the information associated with a comment, stored in comments database 420, may include, for example, the name of the author of the comment, a timestamp indicating the date and/or time that the comment was created, the content of the comment, and/or the address of the originating document.

Figure 10:
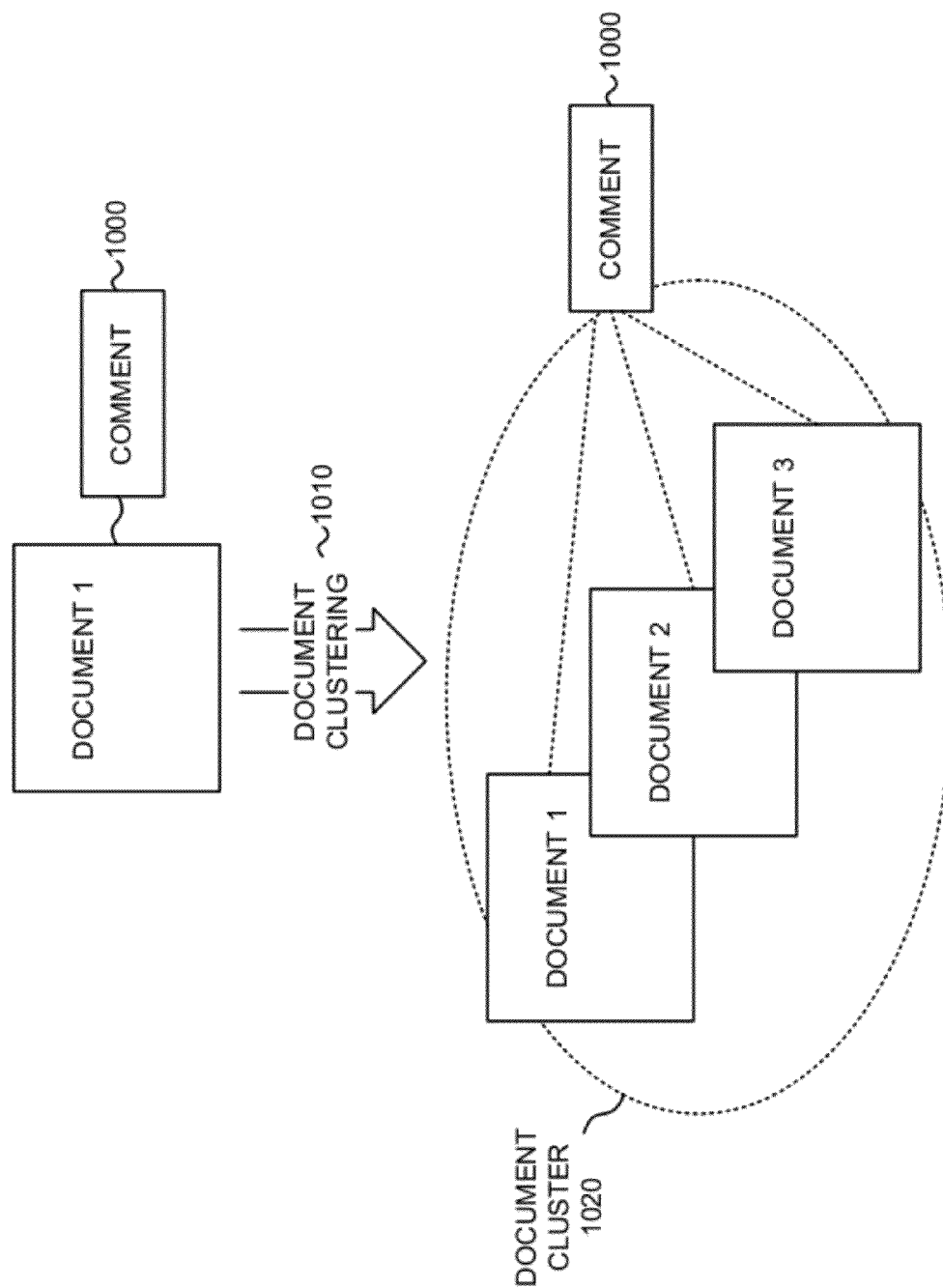
FIG. 10 graphically depicts the exemplary process of FIG. 9.

A comment associated with a document may be selected (block 910). For example, comments component 410 may select an entry, corresponding to a comment, in comments database 420. For example, FIG. 10 depicts a comment 1000, associated with a document (document 1) being selected.

Document clustering information may be obtained (block 920) and other documents that are in a same cluster as the document may be determined (block 930). The obtained document clustering information may identify clusters of documents, where each cluster of documents may include a set of documents that have content related to a same concept or topic. Many different clustering techniques are available to cluster documents and to obtain the document clustering information. Such clustering techniques may, for example, use machine learning techniques that can deduce that documents relate to a same concept or topic even if the documents have different content. The machine learning techniques may learn rules for a model that can be used to determine whether the content of two different documents relate to a same concept or topic. For example, the machine learning techniques may identify synonyms of terms and/or identify text that relate to a same topic or concept even if the text does not contain terms in common. Various clustering techniques may be used depending on a type of the content of the documents being clustered (e.g., documents with news content, documents with product content, documents with business content, etc.).

One exemplary clustering technique involves "chunking" each document into pieces (e.g., sentences) and computing fingerprints for each chunk. A document (document A) can then be considered to relate to a same concept or topic as another document (document B) if a large enough fraction of document A's chunks (e.g., at least a particular threshold number match) are also present in document B. A precedence scheme may also be used with this clustering technique to assign higher precedence values for documents that are considered authoritative. The assigned precedence values may be used as a factor when determining document clusters. FIG. 10 depicts the use of a document clustering technique 1010 to obtain a document cluster 1020 that includes document 1, document 2 and document 3. The "chunking" of each document into pieces may involve overlapping or non-overlapping "chunks." Non-overlapping "Chunking" may include "chunking" the document into complete sentences. Overlapping "chunking" may include "chunking" the document into portions of text (e.g., portions of sentences) that may overlap. For example, the sentence "President Obama gave a dramatic speech on July $4^{th}$" may be "chunked" into two separate, overlapping chunks: "President Obama gave a dramatic speech" and "dramatic speech on July $4^{th}$".

The comment may be associated with the determined documents (block 940). For example, search engine component 430 may provide information regarding the determined documents to comments component 410. In one implementation, the information, provided to comments component 410, may include addresses (e.g., URLs) of the located documents. Comments component 410 may update the entry, corresponding to the comment, in comments database 420 with the information regarding the determined documents. For example, comments component 410 may store the addresses of the determined documents in the other URLs field 560 in comments database 420. Previously recorded user feedback (e.g., block 1160 below) may additionally be used when associating a comment with documents in a cluster. For example, when users identify a comment as being useful or not useful in a specific context (e.g., a cluster context), the context of the identification can be learned such that the comment can be considered useful in one context but not in another. FIG. 10 depicts comment 1000 being additionally associated with document 2 and document 3 in document cluster 1020.

A next comment associated with a document may be selected (block 950). For example, comments component 410 may select another comment to process and return to block 920. In the implementation where a comment is processed when an entry for the comment is created in comments database 420, the process of FIG. 9 may end without selecting a next comment to process. The exemplary process of FIG. 9 may be performed at the time that the comment (selected in block 910) is created, and/or may be performed multiple times (e.g., periodically). If the exemplary process of FIG. 9 is performed periodically, documents associated with a given comment may be added or removed to reflect any changes in the cluster. Thus, comments may be periodically spread to documents in an updated cluster, with "new" documents being added to the cluster and "old" documents being removed from the cluster.

Presenting a Comment in Connection with a Document

Figure 11:
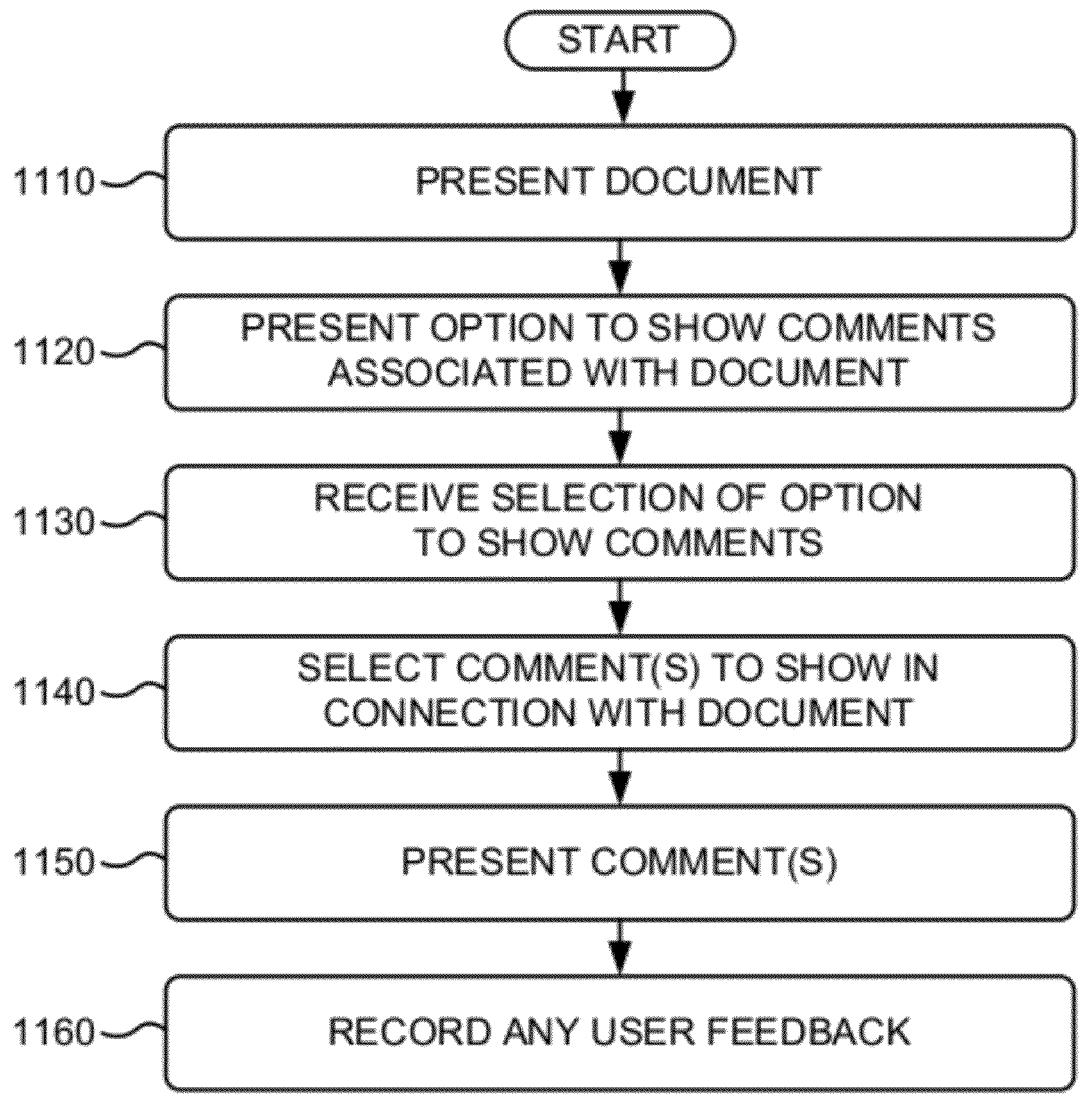
FIG. 11 is a flowchart of an exemplary process for presenting a comment in connection with a document.

FIG. 11 is a flowchart of an exemplary process for presenting a comment in connection with a document. In one implementation, the process of FIG. 11 may be performed by one or more components within client 210, server 220, or a combination of client 210 and server 220. In another implementation, the process may be performed by one or more components within another device or a group of devices separate from or including client 210 and/or server 220. Also, while FIG. 11 shows blocks in a particular order, the actual order may differ. For example, some blocks may be performed in parallel or in a different order than shown in FIG. 11.

The process of FIG. 11 may include presenting a document to a user of client 210 (block 1110). For example, the user may access the document via a browser application operating on client 210. To obtain access to the document, for example, the user might enter an address (e.g., a URL) into the address field of the browser, the user might select a document from a list of documents (e.g., a list of favorites or bookmarks), or the user might perform a search using a search engine and select a search result corresponding to the document.

An option to show comments associated with the document may be presented (block 1120). For example, the browser may include a user interface item (e.g., a button, a menu item, etc.) that may permit the user to turn on and turn off the commenting function provided by the browser. The user may select this user interface item to create a comment, to view a comment, and/or to remove a presented comment from view (e.g., hide the comment from view). In another implementation, the showing of comments regarding a document may occur automatically. For example, a comment(s) regarding a document may be automatically shown when the comment(s) has received a certain level of user feedback (e.g., user ratings above a certain rating threshold). Thus, in this implementation, a comment associated with a document that does not have a sufficient user rating may not be presented.

Figure 12:
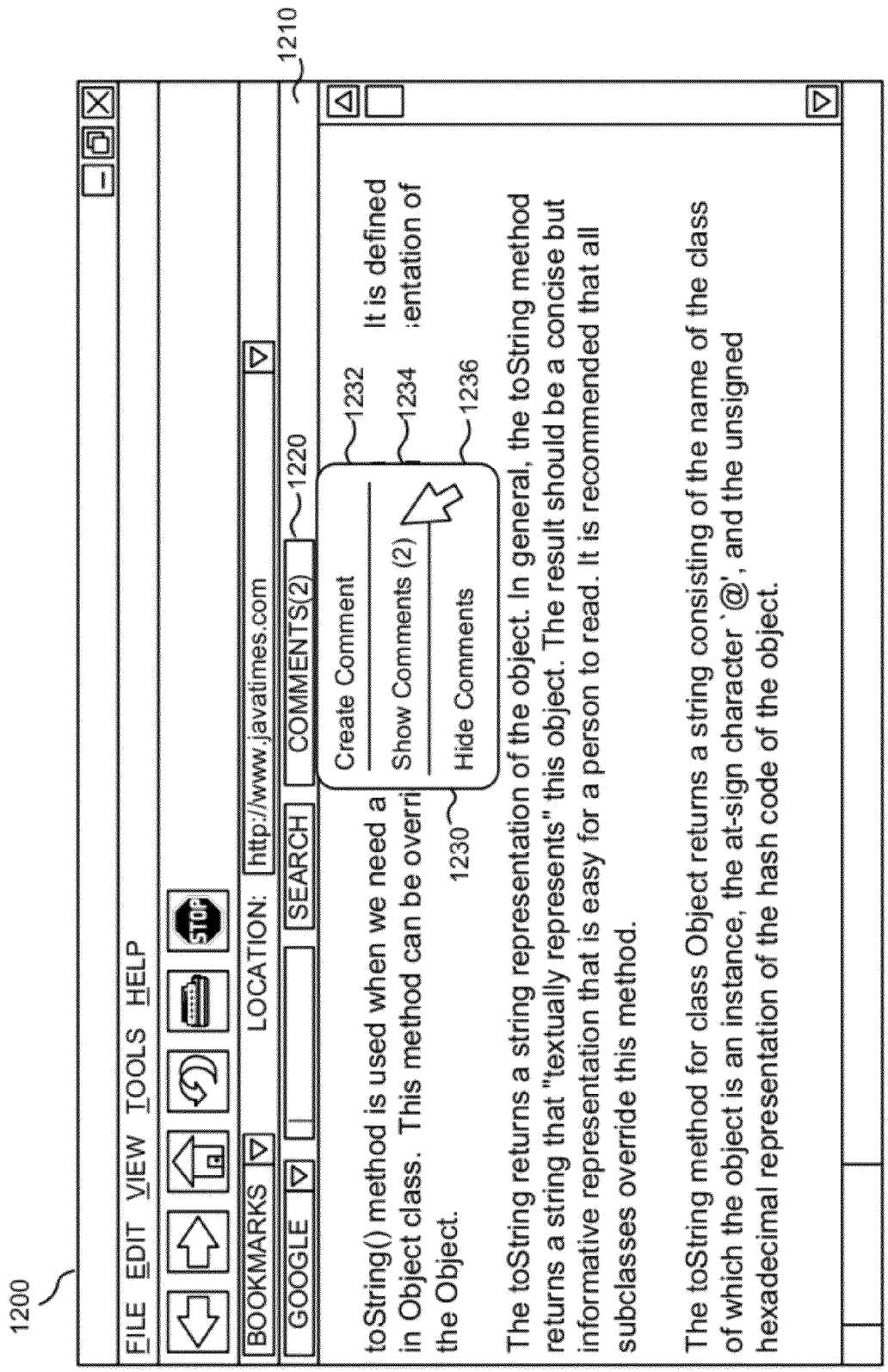
FIGS. 12 and 13 are diagrams of examples of presenting a comment.

FIG. 12 is a diagram of an exemplary user interface that may be presented to a user to permit the user to activate the commenting function of the browser. As shown in FIG. 12, a browser window 1200 may include an add-on toolbar 1210 that includes a search box and a number of software buttons. In one implementation, toolbar 1210 may include a comments button 1220. Comments button 1220 may optionally include information regarding the number of comments (shown as "(2)" in FIG. 12) that have been previously associated with the document that the user is currently accessing (shown as "www.javatimes.com" in FIG. 12).

Comments button 1220 may permit the user to turn on and off the commenting function. In one implementation, selection of comments button 1220 may cause a menu 1230 to be presented. Menu 1230 may include a number of options including, for example, an option to create a comment 1232, an option to show previously created comments 1234, and an option to hide the comments 1236. The user may select option 1232 to generate a comment regarding the document that the user is currently accessing. The user may select option 1234 to view a comment that was previously associated with the document that the user is currently accessing (e.g., FIG. 12 shows that two comments have been previously associated with the document). The user may select option 1236 to remove any presented comments from view (e.g., hide the comments from view).

Returning to FIG. 11, selection of the option to provide a comment regarding the document may be received (block 1130). For example, the user might activate the commenting feature. In one implementation, the user might activate the commenting feature by selecting an item from a menu or by selecting a button on a toolbar. As shown in FIG. 12, for example, the user may select comments button 1220 on toolbar 1210 within browser window 1200, and/or may select option 1234 on menu 1230.

A comment(s) to show in connection with the document may be selected (block 1140). In one implementation, client 210 may send, to server 220, a request for comments associated with the document. For example, client 210 may send information regarding the document, such as an address of the document, to comments component 410. Comments component 410 may access comments database 420 using, for example, the address of the document to retrieve the comments associated with the document. The comments associated with the document may include comments associated with the document using clustering techniques, as described above. In another implementation, an index of comments database 420 may be constructed that lists the comments associated with each document. The index may be constructed using existing indexing techniques. The constructed index may be used to select a comment(s) to show in connection with the document. In yet another implementation, the index of comments database 420 may only include those comments having a sufficient level of user feedback. For example, the index of comments database 420 may only include those comments having user ratings above a certain threshold (i.e., only highly rated comments included in the index).

Comments component 410 may select which comments to present and/or a manner for presenting the comments. In one implementation, comments component 410 may select all comments associated with the document for presentation. In another implementation, comments component 410 may rank the comments in some manner. For example, comments component 410 may generate a score for each of the comments based on one or more factors associated with the comments. One factor for scoring a comment may include a rating of the comment. User feedback, in the form of a rating, may be obtained for various comments. A user may be permitted to provide a rating with regard to a comment presented in connection with a particular document. In one implementation, the rating may indicate whether the user found the comment useful (positive rating) or not useful (negative rating). In another implementation, the rating may indicate a degree of usefulness, such as a rating from 1 to 5. Comments component 410 may obtain the rating of a comment from rating(s) field 570 in comments database 420. Comments component 410 may use the rating factor to score a comment and use the score of a comment to determine whether to present that comment (e.g., present only comments with scores above a threshold) and/or a manner in which to present the comments (e.g., present comments in an order based on their scores). By using a rating to score a comment, comments in which users are interested (e.g., that users find useful) may be presented in connection with a document before or, instead of, comments in which users are not interested (e.g., that users did not find useful).

A further factor for scoring a comment may include user feedback in connection with a comment when shown on a particular document. Some comments may be relevant only to certain documents in a cluster, and, therefore, may not cluster well, whereas other comments pertaining to, for example, different sections of the same document may be relevant to all documents in the cluster. So user feedback (e.g., user rating) for a comment in the context of a particular document the comment was presented upon may be a useful factor when scoring the comment.

Another factor for scoring a comment may include a rank of an author of the comment. The author of a comment may be ranked based on one or more factors, such as the quantity of comments created by the author, a user feedback rating associated with the author (e.g., users might provide feedback regarding comments created by a particular author and this information may be used to rate the author), or whether the author is the user (e.g., users are typically interested in being presented with their own comments). Comments component 410 may use the author ranking factor to score a comment and use the score of the comment to determine whether to present that comment (e.g., present only comments with scores above a threshold) and/or a manner in which to present the comments (e.g., present comments in an order based on their scores). The rank of an author may reflect the quality of the comment created by that author. Thus, by using an author ranking to score a comment, comments associated with higher ranked authors may be presented over comments associated with lower ranked authors.

Yet another factor for scoring a comment may include a timestamp associated with the comment. Comments component 410 may obtain the timestamp from timestamp field 520 in comments database 420. Comments component 410 may use the timestamp factor to score a comment and use the score of the comment to determine whether to present that comment (e.g., present only comments with scores above a threshold) and/or a manner in which to present the comments (e.g., present comments in an order based on their scores). More recent timestamps may reflect fresh, more relevant comments, and less recent timestamps may reflect stale, less relevant comments. Thus, by using a timestamp to score a comment, comments that are more recent, and thus, potentially more relevant, may be presented over older, and potentially less relevant, comments.

A further factor for scoring a comment may include a degree of match between the originating document and the document that the user is currently accessing. Search engine component 430 may determine a degree of match between the documents and generate a score based on this degree of match. Comments component 410 may use the degree of match factor to score a comment and use the score of the comment to determine whether to present that comment (e.g., present only comments with scores above a threshold) and/or a manner in which to present the comments (e.g., present comments in an order based on their scores). A comment may be more relevant to a document with a higher degree of match of its content than to a document with a lower degree of match to its content. Thus, by using a degree of match to score a comment, comments that are associated with a higher degree of matching content (thus, potentially more relevant to the document for which the comment is to be presented) may be presented over comments that are associated with a lower degree of matching content (thus, potentially less relevant to the document for which the comment is to be presented).

Comments component 420 may use one or more of the above-identified factors, and/or other factors, in scoring the comments associated with the document. Comments component 420 may select one or more of the comments based on the scores of the comments.

The selected comment(s) may be presented (block 1150). For example, comments component 420 may send the selected comment(s) to client 210 for presentation by the browser of client 210. In one implementation, the browser may present one or more of the comments within the browser window in which the document is presented. In another implementation, the browser may present one or more of the comments within a window separate from the window in which the document is presented. In yet another implementation, the browser may create a frame (e.g., a regular frame or iframe) and insert information regarding one or more comments in the frame. In a further implementation, the browser may use another mechanism for presenting one or more of the comments.

Figure 13:
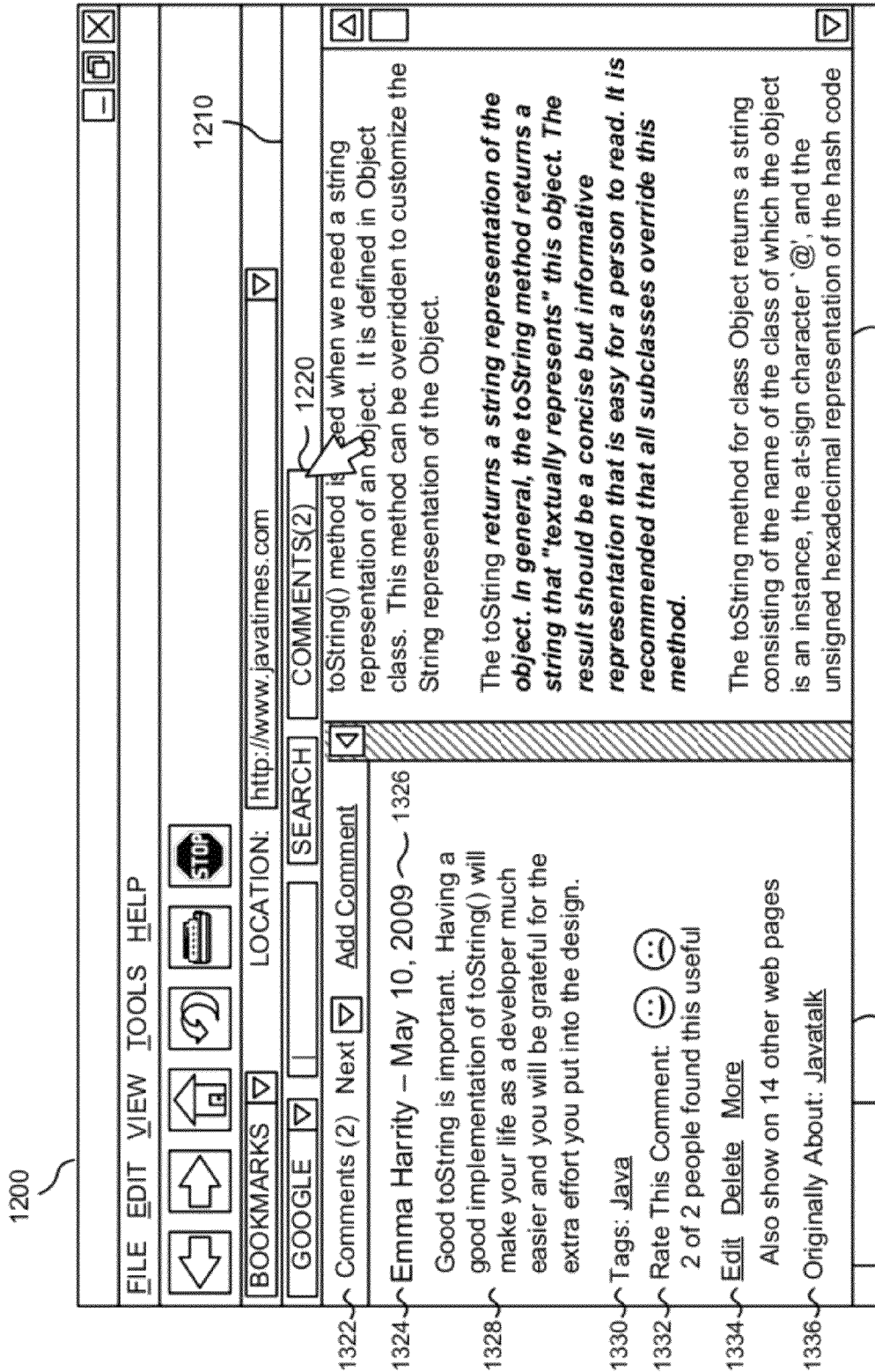

FIG. 13 is a diagram of an exemplary user interface via which a comment may be presented. As shown in FIG. 13, browser window 1200 may include a document section 1310 and a comments section 1320. Document section 1310 may include the content of the document that the user is currently accessing.

Comments section 1320 may include a header section 1322, an author name 1324, a timestamp 1326, a comment content 1328, tags 1330, rating option 1332, options 1334, and originating information 1336. Header section 1322 may include information regarding a quantity of comments that exist for this document, an option to see a next (or previous) comment, and/or an option to add a comment. Author name 1324 may include the name of the user that created the comment. Timestamp 1326 may include the date and/or time at which the comment was created. Comment content 1328 may include the content of the comment.

Tags 1330 may include keywords that may relate to a concept or topic of the comment or the document for which the comment was created. Rating option 1332 may present an option to the user to rate the comment (favorable or unfavorable rating). Rating option 1332 may also present information that indicates how many users found the comment useful (and/or not useful). Options 1334 may present options to the user to edit the comment, delete the comment, and/or obtain additional information regarding the comment. The additional information may include information regarding the other documents with which the comment is associated. Originating information 1336 may include information regarding the document for which the comment was originally created (i.e., the originating document). Originating information 1336 may also present a link to the originating document.

Returning to FIG. 11, any user feedback may be recorded (block 1160). For example, if the user provides user feedback via rating option 1332, the browser may capture this feedback and provide the feedback to comments component 410. Comments component 410 may store the feedback in comments database 420. In one implementation, comments component 410 may combine the feedback with other feedback already received for the comment and this particular document, or for the comment and any document with which the comment has been associated.

CONCLUSION

Implementations, described herein, may spread, using clustering techniques, comments from a document for which the comment was originally created to other documents for which the comment may be relevant.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6, 9, and 11, the order of the blocks may be modified in other implementations. Further, non-dependent blocks may be performed in parallel.

Also, exemplary graphical user interfaces have been described with respect to FIGS. 7, 8, 12, and 13. In other implementations, the graphical user interfaces may include more, fewer, or different pieces of information.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor—creating a specific purpose processor).

Further, it has been described that scores are generated for comments. The scoring scheme has been described where higher scores are better than lower scores. This need not be the case. In another implementation, the scoring scheme may be switched to one in which lower scores are better than higher scores.

Also, it has been described that users create comments regarding documents. In another implementation, comments may be created for portions of documents. A "document portion," as used herein, is intended to refer to less than the entire document. The document portion may include some amount of text (e.g., some number of terms), an image, a video, or some audio.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   receiving, by a processor associated with the one or more server devices, a comment associated with a first document,
   the comment providing an opinion of, or remarks upon, a content of the first document;
   obtaining, by a processor associated with the one or more server devices, document clustering information which indicates that the first document is clustered with one or more second documents, the document clustering information being based on:
      textual information included in the first document, and
      textual information included in the one or more second documents;
   storing, in a memory associated with the one or more server devices, the comment in association with the first document and the one or more second documents based on the document clustering information indicating that the first document is clustered with the one or more second documents;
   presenting, by the one or more server devices, the comment in connection with the first document when the first document is accessed by a client device; and
   presenting, by the one or more server devices, the comment in connection with one of the one or more second documents when the one of the one or more second documents is accessed by the client device.

2. The method of claim 1, further comprising:
   determining that a first topic, relating to the textual information included in the first document, matches a second topic relating to the textual information included in the one or more second documents; and
   performing a clustering technique to group the first document into a cluster with the one or more second documents based on determining that the first topic matches the second topic.

3. The method of claim 1, further comprising:
   using a machine learning technique to group the first document into a cluster with the one or more second documents.

4. The method of claim 2, further comprising:
   obtaining user feedback regarding the comment; and
   using the user feedback to determine whether to include the first document in a same cluster as the one or more second documents when performing the clustering technique.

5. The method of claim 1, where receiving the comment associated with the first document includes:
   receiving one or more of:
      a name of an author who created the comment,
      a timestamp indicating a date or time at which the comment was created,
      a content of the comment, or
      an identifier of the first document.

6. The method of claim 1, where storing the comment in association with the first document and the one or more second documents includes:
   storing, in the memory, an address associated with the first document and an address associated with each of the one or more second documents in connection with information regarding the comment.

7. The method of claim 1, further comprising:
   generating a score for the comment with respect to one of the first document or the one of the one or more second documents; and
   determining whether to present the comment or a manner in which to present the comment based on the score.

8. The method of claim 7, where generating the score for the comment includes:
   assigning a score to the comment based on one or more of:
      user feedback received in connection with the comment,
      an identity of an author who created the comment,
      a timestamp indicating a date or time at which the comment was created, or
      a degree of match between the first document and the one of the one or more second documents.

9. The method of claim 1, where presenting the comment in connection with the one of the one or more second documents includes:
   receiving a request from the client device, where the request includes information identifying the one of the one or more second documents,
   identifying, based on the request, the comment in the memory, and
   determining whether to present the comment or a manner in which to present the comment in connection with the one of the one or more second documents.

10. The method of claim 9, further comprising:
    assigning a score to the comment based on one or more of:
       user feedback received in connection with the comment,
       an identity of an author who created the comment,
       a timestamp indicating a date or time at which the comment was created, or
       a degree of match between the first document and the one of the one or more second documents;
    where determining whether to present the comment or the manner in which to present the comment includes:
       determining whether to present the comment to the client device or the manner in which to present the comment to the client device based on the score assigned to the comment.

11. The method of claim 1, where presenting the comment in connection with the one of the one or more second documents includes:
    providing the comment for presentation on a display of the client device, the comment being presented on the display concurrently with a content of the at least one of the one or more second documents.

12. The method of claim 1, where storing the comment includes:
    storing, in the memory, at least two of:
       information associated with an author who created the comment,
       a timestamp indicating a date or time at which the comment was created,
       a content of the comment,
       an identifier associated with the first document,
       an address associated with the one of the one or more of the second documents, or
       a rating associated with the comment.

13. A system, comprising:
    one or more devices to:
       receive a comment associated with a first document, the comment providing an opinion or remark regarding at least a portion of the first document,
       determine that the first document is clustered with a second document based on:
          text included in the first document, and text included in the second document,
store the comment in association with the first document and the second document based on determining that the first document is clustered with the second document,
receive, from a client device, information that the client device is accessing the second document, and
transmit the comment for presentation in connection with the second document on a display associated with the client device.

14. The system of claim 13, where, when determining that the first document is clustered with the second document, the one or more devices are to:
determine that a first topic, relating to the text included in the first document, matches a second topic relating to the text included in the second document; and
perform a clustering technique to group the first document into a cluster with the second document based on determining that the first topic matches the second topic.

15. The system of claim 14, where, when performing the clustering technique, the one or more devices are to:
use a machine learning technique to group the first document into a cluster with the one or more second documents.

16. The system of claim 14, where the one or more devices further are to:
obtain user feedback regarding the comment, and
use the user feedback to determine whether to include the first document in a same cluster as the second document when performing the clustering technique.

17. One or more server devices, comprising:
a memory; and
one or more processors to:
determine that a first document is related to a same topic or concept as a second document based on:
text included in the first document, and
text included in the second document,
receive a comment associated with the first document, the comment providing an opinion or remark regarding at least a portion of the first document,
store, in the memory, the comment in association with the first document and the second document based on determining that the first document is related to the same topic or concept as the second document,
receive, from a client device, information indicating that the client device is accessing the second document, and
transmit the comment for presentation in connection with the second document on a display associated with the client device.

18. The one or more server devices of claim 17, where, when receiving the comment associated with the first document, the one or more processors are to receive one or more of:
a name of an author who created the comment,
a timestamp indicating a date or time at which the comment was created,
a content of the comment, or
an address of the first document.

19. The one or more server devices of claim 17, where, when storing the comment in association with the first document and the second document, the one or more processors are to store, in the memory, an address associated with the first document and an address associated with the second document in connection with information regarding the comment.

20. The one or more server devices of claim 17, where the one or more processors are further to:
generate a score for the comment with respect to one of the first document or the second document; and
determine whether to transmit the comment to the client device for presentation based on the score.

21. The one or more server devices of claim 20, where, when generating the score for the comment, the one or more processors are to assign a score to the comment based on one or more of:
user feedback received in connection with the comment,
an identity of an author who created the comment,
a timestamp indicating a date or time at which the comment was created, or
a degree of match between the first document and the second document.

22. The one or more server devices of claim 17, where, when receiving information indicating that the client device is accessing the second document, the one or more processors are to:
receive a request from the client device, where the request includes information identifying the second document,
identify, based on the request, the comment in the memory, and
determine whether to transmit the comment to the client device for presentation in connection with the second document.

23. The one or more server devices of claim 22, where the one or more processors are further to:
assign a score to the comment based on one or more of:
user feedback received in connection with the comment,
an identity of an author who created the comment,
a timestamp indicating a date or time at which the comment was created, or
a degree of match between the first document and the second document;
where, when determining whether to transmit the comment, the one or more processors are to determine whether to transmit the comment to the client device based on the score assigned to the comment.

24. The one or more server devices of claim 17, where, when transmitting the comment, the one or more processors are to provide the comment for presentation on the display of the client device, the comment being presented on the display concurrently with a content of the second document.

25. The one or more server devices of claim 17, where the memory is to store, in connection with the comment, at least two of:
information associated with an author who created the comment,
a timestamp indicating a date or time at which the comment was created,
a content of the comment,
information associated with the first portion of the first document,
an address associated with the first document,
an address associated with the second document, or
a rating associated with the comment.

* * * * *